Aug. 31, 1948.  W. R. WHITFIELD  2,448,202
NEST STRUCTURE
Filed March 9, 1945
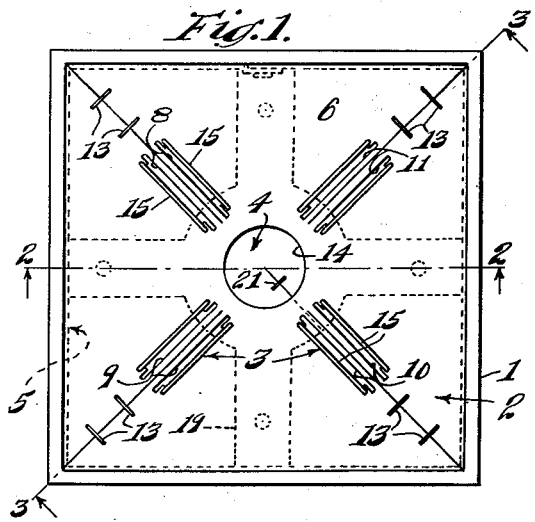
Fig. 1.
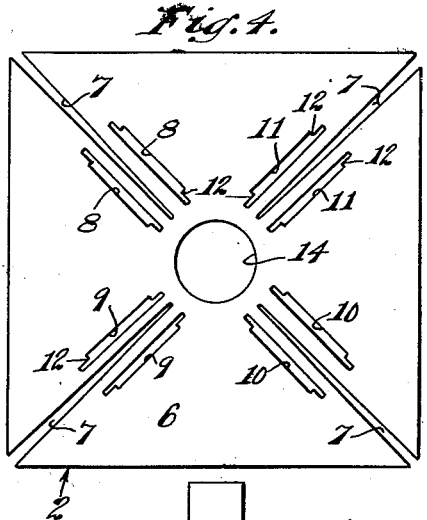
Fig. 4.
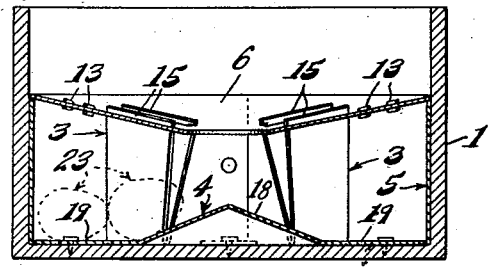
Fig. 2.
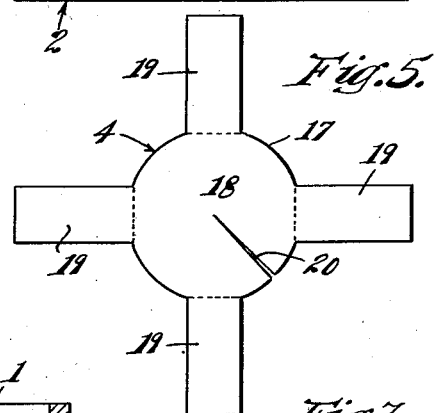
Fig. 5.
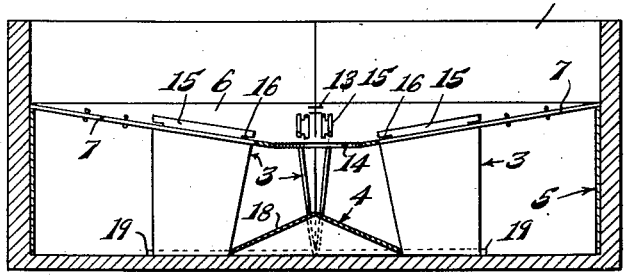
Fig. 3.
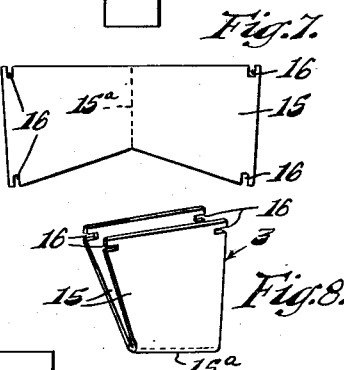
Fig. 7.
Fig. 8.
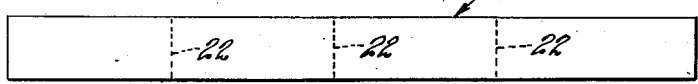
Fig. 9.
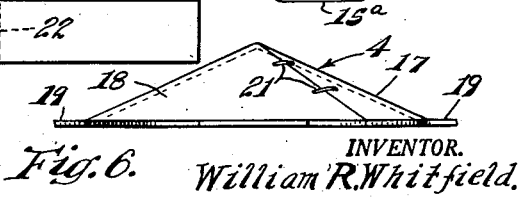
Fig. 6.
INVENTOR.
William R. Whitfield.
BY Bair & Freeman
Atty's.

Patented Aug. 31, 1948

2,448,202

UNITED STATES PATENT OFFICE 2,448,202

NEST STRUCTURE

William Russell Whitfield, Ames, Iowa

Application March 9, 1945, Serial No. 581,844

4 Claims. (Cl. 119—48)

My invention relates to a nest structure to be used in the nests of laying hens and the like, which is of such character as to remove the eggs as soon as they are laid for thereby avoiding breakage and keeping them clean.

It is an object of my invention to provide such a nest structure having parts which can be readily removed and thrown away or cleaned.

Another object is to provide in such structure a platform preferably generally concave, with a hole at the lowest part to permit the egg to drop through, and to combine the platform with suitable means for removing the egg from below the hole so the next egg will not drop on it.

With these and other objects in view, my invention consists in the construction, arrangement and combination of the various parts of my device whereby the objects contemplated are attained, as hereinafter more fully set forth, pointed out in my claims, and illustrated in the accompanying drawing, wherein:

Figure 1 is a top or plan view of a nest structure embodying my invention.

Figure 2 is a vertical, sectional view taken on the line 2—2 of Figure 1.

Figure 3 is a vertical, sectional view taken on the line 3—3 of Figure 1.

Figure 4 is a plan view of a blank for making the platform structure which may be used in one embodiment of my invention.

Figure 5 is a plan view of the blank for making the member to be placed in the bottom of the nest to cause the eggs dropping through the platform to move away.

Figure 6 is a side elevation of the member on which the eggs are dropped, certain of the tabs being shown as broken off.

Figure 7 is a plan view of a blank from which the supports for the platform are made.

Figure 8 is a perspective view of one of the supports in folded position, and

Figure 9 is a plan view of one of the blanks for the cushioning liner for the lower part of the nest.

My improved platform and support and the member on which the eggs drop can be made of any material suitable for the purpose. For example, they may be made of such material as cardboard, which may be thrown away as it gets dirty or worn, or they can be made of a material such as plastic or otherwise, which can be washed and replaced.

It will be obvious from the following description that many changes might be made in details of structure. I shall describe one illustrative structure which I believe is itself a distinct invention, but it will be clear that the broad invention may be embodied in other details of structure.

In Figures 1, 2 and 3 I have shown a box-like member 1 which is the ordinary wood or metal nest. The structure embodying my invention I place within this box-like nest 1.

My structure includes a platform indicated generally at 2 (Figure 1), supports therefor indicated generally at 3 (Figure 2), an element on which the eggs may drop through the platform indicated generally at 4 (Figure 2), and a cushioning liner for the wood box indicated generally at 5 (Figure 2).

The platform 2 may be made from a blank 6 shown in Figure 4, generally of an outline to fit the nest 1. As shown in the drawing the blank 6 and the platform 2 into which the blank is made, are substantially rectangular. In the construction of the platform from the blank 6, slots 7 are cut from the corners inwardly toward the center of the blank and tapered to their inner ends as shown in Figure 4.

The edges of the material adjacent the sides of the respective slots 7 are drawn to butting or joined position and fastened together by staples 13. The effect is to produce a platform with a concave upper face.

The platform is provided with a hole 14 at the lowest spot to insure that the egg will drop through.

To hold up the platform 6 I provide the supports 3. These may be of any suitable size and shape and may be fastened to the platform in any convenient way. To illustrate one form of support and one way of connecting the supports to the platform, I show in Figure 7 a blank 15 from which a support 3 is made. The blank 15 may be made of any suitable material, for instance, pasteboard, in the form of a strip folded along its center at the transverse line 15a and having at its side edges near its ends, slots 16. The blank 6 may be provided with spaced pairs of bayonet joint slots 8, 9, 10 and 11 (Figure 4). The slots of each pair are substantially parallel. Portions adjacent each other are longer than the portions farther from each other, which latter portions have the shoulders 12. This is for the purpose of getting the bayonet joint effect. The blank 15 is folded to a V-shape as shown in Figure 8, and the ends 16 are inserted through the long slots 8, 9, 10 and 11. The material is preferably such that the upper ends of the support are normally biased to spread apart so that they thus enter the narrow or shorter parts of the slots 8, 9, 10 and 11, and are thus detachably locked in position for supporting the platform (Figures 1 and 2). If desired the upper ends of the supports 3 may be bent over and stapled to the platform.

The blank 17 from which is formed the device 4 on which the eggs drop, is illustrated in Figure 5. It has a central disc 18, with projecting tabs 19 for extending practically to the sides of the nest 1 to keep the device centered under the hole 14. The blank 17 is provided with an inwardly extending, inwardly tapering slot 20. The edges of the material at the sides of the slot are pulled to joining position and fastened together by staples 21 to form a convex or cone-shaped member from the disc 18. This device 4 is put in the bottom of the nest 1 and the cone-shaped member will be below the hole 14, as clearly shown in Figure 2.

The cushioning liner 5 is made of a strip of pasteboard or the like shown in Figure 9, folded on transverse lines 22 corresponding to the corners of the box-like nest 1, and this cushioning liner 5 is extended around the inside of the walls of the nest 1 below the platform 2.

It will be obvious that in use, when the egg is laid it drops through the hole 14 on the cone-shaped part of the member 4 and will roll toward the side as indicated at 23 in Figure 2. The advantage of having a structure which will remove the eggs from beneath the bird so they cannot be struck by the feet and to a place where they cannot get dirty is obvious.

When my improved nest structure becomes soiled, the platform 2 and its supports 3 may be removed and thrown away or washed, depending on the type of material used. The egg deflector 4 will last for a long time without getting dirty and without necessity for replacement, but can be easily replaced if that becomes necessary.

From what I have described above, it is to be understood that it is my purpose to cover by my claims any modification in structure which may be reasonably included within the scope of my invention and my claims.

I claim as my invention:

1. In a nest structure, a removable platform adapted to be placed in a nest to support a laying-bird, including a platform means having a low spot with a hole therein through which the egg may pass and supporting elements for the platform means, said platform means having pairs of bayonet type slots, and said supporting elements each having parts normally biased to spread apart for entering said slots and engaging the platform.

2. In a nest structure, a sheet of squared outline having inwardly tapering slots extending from its outer edges at the corners, and having an opening at the center of the sheet, the slots extending substantially to said opening, and slots on opposite sides of each of said tapering slots, whereby each portion of the sheet having two of the second slots adjacent each other therein may be moved so that the adjoining edges of the tapering slots contact each other, and fastening means for holding said adjoining edges together.

3. A nest structure for a nest box including a concave platform, said platform being formed of a sheet of squared outline having inwardly tapering slots extending from its outer edges at the corners, and having an opening for the passage of eggs at the center of the sheet, the slots extending substantially to said opening, whereby each portion of the sheet is adapted to provide a concave shape with adjoining edges of the slots contacting each other, means for fastening said adjoining edges together, and means for supporting the platform from the nest box.

4. A nest structure for a nest box including a concave platform, said platform being formed of a sheet of squared outline having inwardly tapering slots extending from its outer edges at the corners, and having an opening for the passage of eggs at the center of the sheet, the slots extending substantially to said opening, whereby each portion of the sheet is adapted to provide a concave shape with adjoining edges of the slots contacting each other, means for fastening said adjoining edges together, means for supporting the platform from the nest box, a convex member positioned below said hole and being formed of a sheet of material having a central disc, a slot in said disc tapering from the center to the edge thereof, whereby the slot is adapted to be pulled together so that the edges thereof contact to provide a convex member, and means for fastening said last mentioned edges together.

WILLIAM RUSSELL WHITFIELD.

REFERENCES CITED

The following references are of record in the file of this patent:

UNITED STATES PATENTS

| Number | Name | Date |
|---|---|---|
| 570,821 | Senat | Nov. 3, 1896 |
| 1,123,300 | Irwin | Jan. 5, 1915 |
| 1,172,667 | Bunnell | Feb. 22, 1916 |
| 1,375,778 | Clearwater | Apr. 26, 1921 |
| 1,728,700 | Purdy | Sept. 17, 1929 |
| 2,000,915 | Blake | May 4, 1935 |
| 2,115,181 | Shapiro | Apr. 26, 1938 |
| 2,368,358 | Hayes | Jan. 30, 1945 |

FOREIGN PATENTS

| Number | Country | Date |
|---|---|---|
| 139,129 | Great Britain | 1919 |